(12) United States Patent
Chen et al.

(10) Patent No.: US 10,673,350 B2
(45) Date of Patent: Jun. 2, 2020

(54) MULTIPLE OUTPUT RECTIFIER AND OPERATION METHOD THEREOF

(71) Applicant: Leadtrend Technology Corp., Hsinchu County (TW)

(72) Inventors: Po-Hung Chen, Hsinchu County (TW); Sheng-Kai Hsieh, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 268 days.

(21) Appl. No.: 15/860,625

(22) Filed: Jan. 2, 2018

(65) Prior Publication Data

US 2018/0191266 A1    Jul. 5, 2018

(30) Foreign Application Priority Data

Jan. 5, 2017    (TW) .............. 106100225 A

(51) Int. Cl.

| | | |
|---|---|---|
| *H02M 7/217* | (2006.01) | |
| *H02M 1/36* | (2007.01) | |
| *H02M 7/219* | (2006.01) | |
| *H02M 1/00* | (2006.01) | |

(52) U.S. Cl.
CPC .............. *H02M 7/217* (2013.01); *H02M 1/36* (2013.01); *H02M 7/219* (2013.01); *H02M 2001/009* (2013.01); *H02M 2007/2195* (2013.01); *Y02B 70/1408* (2013.01)

(58) Field of Classification Search
CPC .. H02M 7/217; H02M 1/36; H02M 2001/009; H02M 2007/2195; Y02B 70/1408
See application file for complete search history.

(56) References Cited

U.S. PATENT DOCUMENTS

| | | |
|---|---|---|
| 6,456,514 B1 | 9/2002 | Perreault |
| 2015/0263534 A1 | 9/2015 | Lee |
| 2018/0062416 A1* | 3/2018 | Terry ............... H02J 50/10 |

FOREIGN PATENT DOCUMENTS

JP    2014-75871 A    4/2014

* cited by examiner

*Primary Examiner* — Carlos Amaya
(74) *Attorney, Agent, or Firm* — Winston Hsu

(57) ABSTRACT

A multiple output rectifier includes a comparator-based active rectification circuit and a controller, wherein the controller is coupled to the comparator-based active rectification circuit. The comparator-based active rectification circuit is used for generating and outputting each output voltage of a plurality of output voltages according to an input voltage, the each output voltage, and a control signal corresponding to the each output voltage. The controller is used for generating the control signal according to the each output voltage and a reference voltage corresponding to the each output voltage.

15 Claims, 10 Drawing Sheets

MULTIPLE OUTPUT RECTIFIER AND OPERATION METHOD THEREOF

BACKGROUND OF THE INVENTION

1. Field of the Invention

The present invention relates to a multiple output rectifier and an operation method thereof, and particularly to a multiple output rectifier and an operation method thereof that do not need any additional direct current (DC)-direct current (DC) converter and discrete component.

2. Description of the Prior Art

In the prior art, a wireless charging receiver utilizes abridge rectifier to rectify an alternating current (AC) voltage to generate a direct current (DC) voltage, and then utilizes an inductive DC-DC converter to stabilize the DC voltage at a target voltage. Although the inductive DC-DC converter can provide a stable output voltage with high efficiency, the inductive DC-DC converter needs several discrete inductor or capacitor components. Therefore, the inductive DC-DC converter not only increases cost of the wireless charging receiver, but also is difficultly integrated into a wearable apparatus because the several discrete inductor or capacitor components have larger volume. In addition, although a linear DC-DC converter provided by the prior art can avoid utilizing discrete components, the linear DC-DC converter has lower power conversion efficiency in high conversion ratio. Therefore, the prior art is not a good choice for the wireless charging receiver.

SUMMARY OF THE INVENTION

An embodiment of the present invention provides a multiple output rectifier. The multiple output rectifier includes a comparator-based active rectification circuit. The comparator-based active rectification circuit is used for generating and outputting each output voltage of a plurality of output voltages according to an input voltage, the each output voltage, and a control signal corresponding to the each output voltage.

Another embodiment of the present invention provides a multiple output rectifier. The multiple output rectifier includes a comparator-based active rectification circuit and a controller. The comparator-based active rectification circuit is used for generating and outputting each output voltage of a plurality of output voltages according to an input voltage, the each output voltage, and a control signal corresponding to the each output voltage. The controller is coupled to the active rectification circuit for generating the control signal according to the each output voltage and a reference voltage corresponding to the each output voltage.

Another embodiment of the present invention provides an operation method of a multiple output rectifier, wherein the multiple output rectifier includes a comparator-based active rectification circuit, and the active rectification circuit includes a comparator-based circuit and a plurality of turning-on circuits. The operation method includes the active rectification circuit generating and outputting each output voltage of a plurality of output voltages according to an input voltage, the each output voltage, and a control signal corresponding to the each output voltage.

Another embodiment of the present invention provides an operation method of a multiple output rectifier, wherein the multiple output rectifier includes a comparator-based active rectification circuit and a controller, and the active rectification circuit includes a comparator-based circuit and a plurality of turning-on circuits. The operation method includes the controller generating a control signal according to each output voltage of a plurality of output voltages outputted by the multiple output rectifier and a reference voltage corresponding to the each output voltage; and the active rectification circuit generating and outputting the each output voltage according to an input voltage, the each output voltage, and the control signal.

The present invention provides a multiple output rectifier and an operation method thereof. Because the multiple output rectifier can provide a plurality of stable output voltages to a next stage circuit system, the present invention can be suitable for a wireless charging receiver. In addition, compared to the prior art, because the multiple output rectifier can stabilize the plurality of stable output voltages at corresponding predetermined values thereof by controlling turning-on times of transistors of a comparator-based circuit of the multiple output rectifier, the present invention does not need any additional direct current (DC)-direct current (DC) converter and discrete component. Therefore, because the present invention does not need any additional DC-DC converter and discrete component, the present invention not only can reduce cost of the multiple output rectifier, but can also be integrated into other application apparatuses easily.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
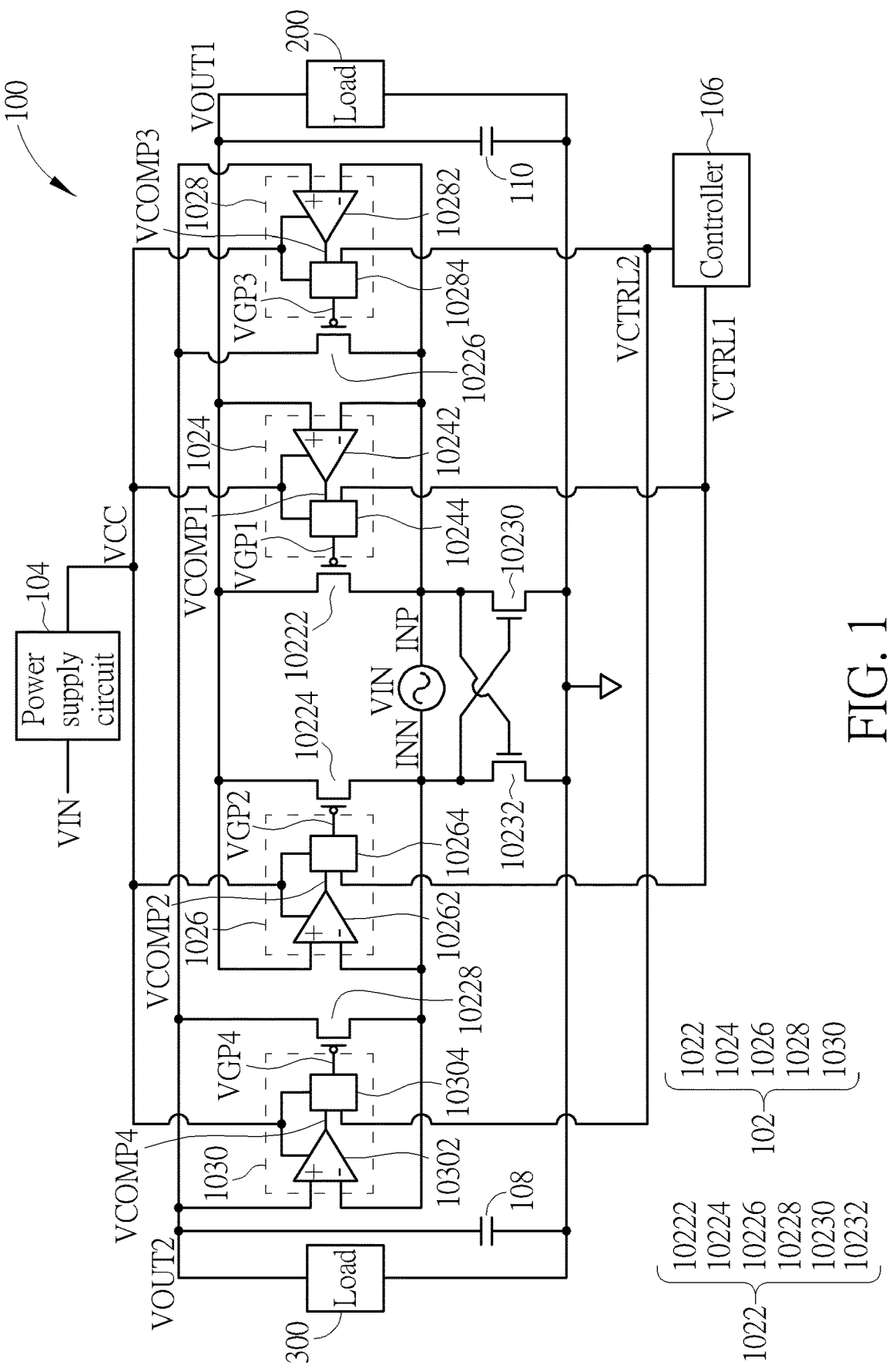
FIG. 1 is a diagram illustrating a multiple output rectifier according to a first embodiment of the present invention.

Please refer to FIG. 1. FIG. 1 is a diagram illustrating a multiple output rectifier 100 according to a first embodiment of the present invention, wherein the multiple output rectifier 100 includes a comparator-based active rectification circuit 102 and a power supply circuit 104, the active rectification circuit 102 includes a comparator-based circuit 1022 and 4 turning-on circuits 1024-1030, and the turning-on circuits 1024-1030 are coupled to the comparator-based circuit 1022. In addition, as shown in FIG. 1, the power supply circuit 104 is coupled to the active rectification circuit 102 for generating a supply voltage VCC applied to the turning-on circuits 1024-1030 according to an alternating current input voltage VIN. As shown in FIG. 1, the turning-on circuits 1024, 1026 correspond to an output voltage VOUT1 outputted by the multiple output rectifier 100, and the turning-on circuits 1028, 1030 correspond to an output voltage VOUT2 outputted by the multiple output rectifier 100, wherein the output voltage VOUT1 is applied to a load 200 and the output voltage VOUT2 is applied to a load 300. But, the present invention is not limited to the multiple output rectifier 100 only outputting the output voltages VOUT1, VOUT2. That is to say, the multiple output rectifier 100 can output at least two output voltages, and a number of turning-on circuits included in the active rectification circuit 102 can be changed with a number of output voltages outputted by the multiple output rectifier 100 accordingly. As shown in FIG. 1, the comparator-based circuit 1022 includes a first P-type metal-oxide-semiconductor transistor 10222, a second P-type metal-oxide-semiconductor transistor 10224, a third P-type metal-oxide-semiconductor transistor 10226, a fourth P-type metal-oxide-semiconductor transistor 10228, a first N-type metal-oxide-semiconductor transistor 10230, and a second N-type metal-oxide-semiconductor transistor 10232, wherein coupling relationships between the first P-type metal-oxide-semiconductor transistor 10222, the second P-type metal-oxide-semiconductor transistor 10224, the third P-type metal-oxide-semiconductor transistor 10226, the fourth P-type metal-oxide-semiconductor transistor 10228, the first N-type metal-oxide-semiconductor transistor 10230, and the second N-type metal-oxide-semiconductor transistor 10232 can be referred to FIG. 1, so further description thereof is omitted for simplicity. In addition, as shown in FIG. 1, the turning-on circuit 1024 includes a first comparator 10242 and a first logic circuit 10244; the turning-on circuit 1026 includes a second comparator 10262 and a second logic circuit 10264; the turning-on circuit 1028 includes a third comparator 10282 and a third logic circuit 10284; and the turning-on circuit 1030 includes a fourth comparator 10302 and a fourth logic circuit 10304, wherein coupling relationships between the first comparator 10242, the first logic circuit 10244, the second comparator 10262, the second logic circuit 10264, the third comparator 10282, the third logic circuit 10284, the fourth comparator 10302, and the fourth logic circuit 10304 can be referred to FIG. 1, so further description thereof is omitted for simplicity. In addition, when amplitude of the alternating current input voltage VIN is larger, the supply voltage VCC can still make the multiple output rectifier 100 operate normally. That is to say, the present invention can provide the supply voltage VCC with higher potential to the turning-on circuits 1024-1030 to make the first P-type metal-oxide-semiconductor transistor 10222, the second P-type metal-oxide-semiconductor transistor 10224, the third P-type metal-oxide-semiconductor transistor 10226, and the fourth P-type metal-oxide-semiconductor transistor 10228 be smoothly turned off to enlarge an application scope of the multiple output rectifier 100.

Figure 2:
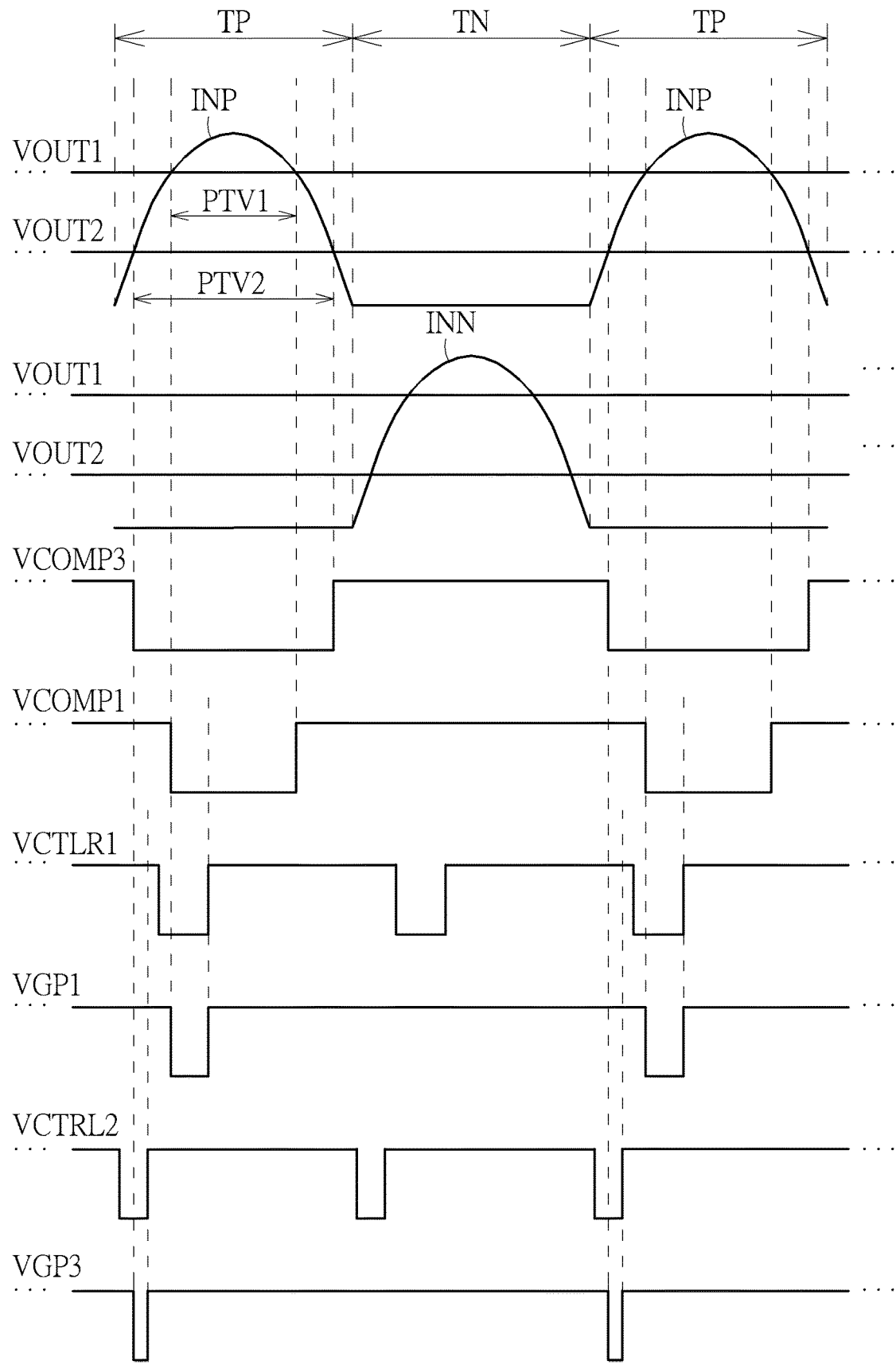
FIG. 2 is a timing diagram illustrating operation of the multiple output rectifier within a positive half period of the alternating current input voltage.

Please refer to FIG. 2. FIG. 2 is a timing diagram illustrating operation of the multiple output rectifier 100 within a positive half period TP of the alternating current input voltage VIN. As shown in FIG. 2, when a direct current voltage INP (wherein the direct current voltage INP is a voltage signal generated by the alternating current input voltage VIN being rectified by a half-wave method or a full-wave method) corresponding to the positive half period TP of the alternating current input voltage VIN is greater than the output voltage VOUT2, the third comparator 10282 generates a comparison signal VCOMP3, and then the third logic circuit 10284 can execute a logic operation on the comparison signal VCOMP3 and a control signal VCTRL2 corresponding to the output voltage VOUT2 to generate a turning-on signal VGP3, wherein the control signal VCTRL2 is generated by a controller 106 further included in the multiple output rectifier 100, the controller 106 is coupled to the active rectification circuit 102, and the comparison signal VCOMP3 corresponds to a predetermined time interval PTV2 within the positive half period TP of the alternating current input voltage VIN. In addition, in one embodiment of the present invention, the third logic circuit 10284 is an OR gate, and the logic operation executed by the third logic circuit 10284 is "OR" operation. As shown in FIG. 1, after the third logic circuit 10284 generates the turning-on signal VGP3, the third P-type metal-oxide-semiconductor transistor 10226 can be turned on according to the turning-on signal VGP3, wherein when the third P-type metal-oxide-semiconductor transistor 10226 is turned on according to the turning-on signal VGP3, the third P-type metal-oxide-semiconductor transistor 10226 and the second N-type metal-oxide-semiconductor transistor 10232 of the comparator-based circuit 1022 can provide a corresponding current path to charge a second capacitor 108 further included in the multiple output rectifier 100, resulting in the comparator-based circuit 1022 generating and outputting the output voltage VOUT2 during turning-on of the third P-type metal-oxide-semiconductor transistor 10226, wherein the output voltage VOUT2 can be provided to a next stage analog circuit or a next stage digital circuit, or can charge a battery. In addition, the present invention is not limited to the third comparator 10282 generating the comparison signal VCOMP3 when the direct current voltage INP is greater than the output voltage VOUT2. That is to say, in another embodiment of the present invention, the third comparator 10282 generates the comparison signal VCOMP3 when the direct current voltage INP is less than the output voltage VOUT2, and then the third logic circuit 10284 executes the logic operation on an inverse comparison signal $\overline{VCOMP3}$ and the control signal VCTRL2 to generate the turning-on signal VGP3.

As shown in FIG. 2, when the direct current voltage INP is greater than the output voltage VOUT1, the first comparator 10242 generates a comparison signal VCOMP1, and then the first logic circuit 10244 can execute the logic operation on the comparison signal VCOMP1 and a control signal VCTRL1 corresponding to the output voltage VOUT1 to generate a turning-on signal VGP1, wherein the control signal VCTRL1 is generated by the controller 106, and the comparison signal VCOMP1 corresponds to a predetermined time interval PTV1 within the positive half period TP of the alternating current input voltage VIN. In addition, the first logic circuit 10244 is also an OR gate, and the logic operation executed by the first logic circuit 10244 is also "OR" operation. As shown in FIG. 1, after the first logic circuit 10244 generates the turning-on signal VGP1, the first P-type metal-oxide-semiconductor transistor 10222 can be turned on according to the turning-on signal VGP1, wherein when the first P-type metal-oxide-semiconductor transistor 10222 is turned on according to the turning-on signal VGP1, the first P-type metal-oxide-semiconductor transistor 10222 and the second N-type metal-oxide-semiconductor transistor 10232 of the comparator-based circuit 1022 can also provide a corresponding current path to charge a first capacitor 110 further included in the multiple output rectifier 100, resulting in the comparator-based circuit 1022 generating and outputting the output voltage VOUT1 during turning-on of the first P-type metal-oxide-semiconductor transistor 10222, wherein the output voltage VOUT1 can also be provided to a next stage analog circuit or a next stage digital circuit, or can charge a battery. In addition, the present invention is not limited to the first comparator 10242 generating the comparison signal VCOMP1 when the direct current voltage INP is greater than the output voltage VOUT1. That is to say, in another embodiment of the present invention, the first comparator 10242 generates the comparison signal VCOMP1 when the direct current voltage INP is less than output voltage VOUT1, and then the first logic circuit 10244 executes the logic operation on an inverse comparison signal $\overline{VCOMP1}$ and the control signal VCTRL1 to generate the turning-on signal VGP1.

As shown in FIG. 2, because the first P-type metal-oxide-semiconductor transistor 10222 is turned on according to the turning-on signal VGP1, and the turning-on signal VGP1 is determined by the comparison signal VCOMP1 and the control signal VCTRL1, a user can control turning-on time of the first P-type metal-oxide-semiconductor transistor 10222 through width of the predetermined time interval PTV1 (because the comparison signal VCOMP1 corresponds to the predetermined time interval PTV1) and width of the control signal VCTRL1; and similarly, the user can also control turning-on time of the third P-type metal-oxide-semiconductor transistor 10226 through width of the predetermined time interval PTV2 (because the comparison signal VCOMP3 corresponds to the predetermined time interval PTV2) and width of the control signal VCTRL2. In addition, the present invention is not limited to the first logic circuit 10244 and the third logic circuit 10284 being OR gates. That is to say, any configuration in which the first logic circuit 10244 and the third logic circuit 10284 can make the turning-on signal VGP1 and the turning-on signal VGP3 be not overlapped each other falls within the scope of the present invention.

Figure 3:
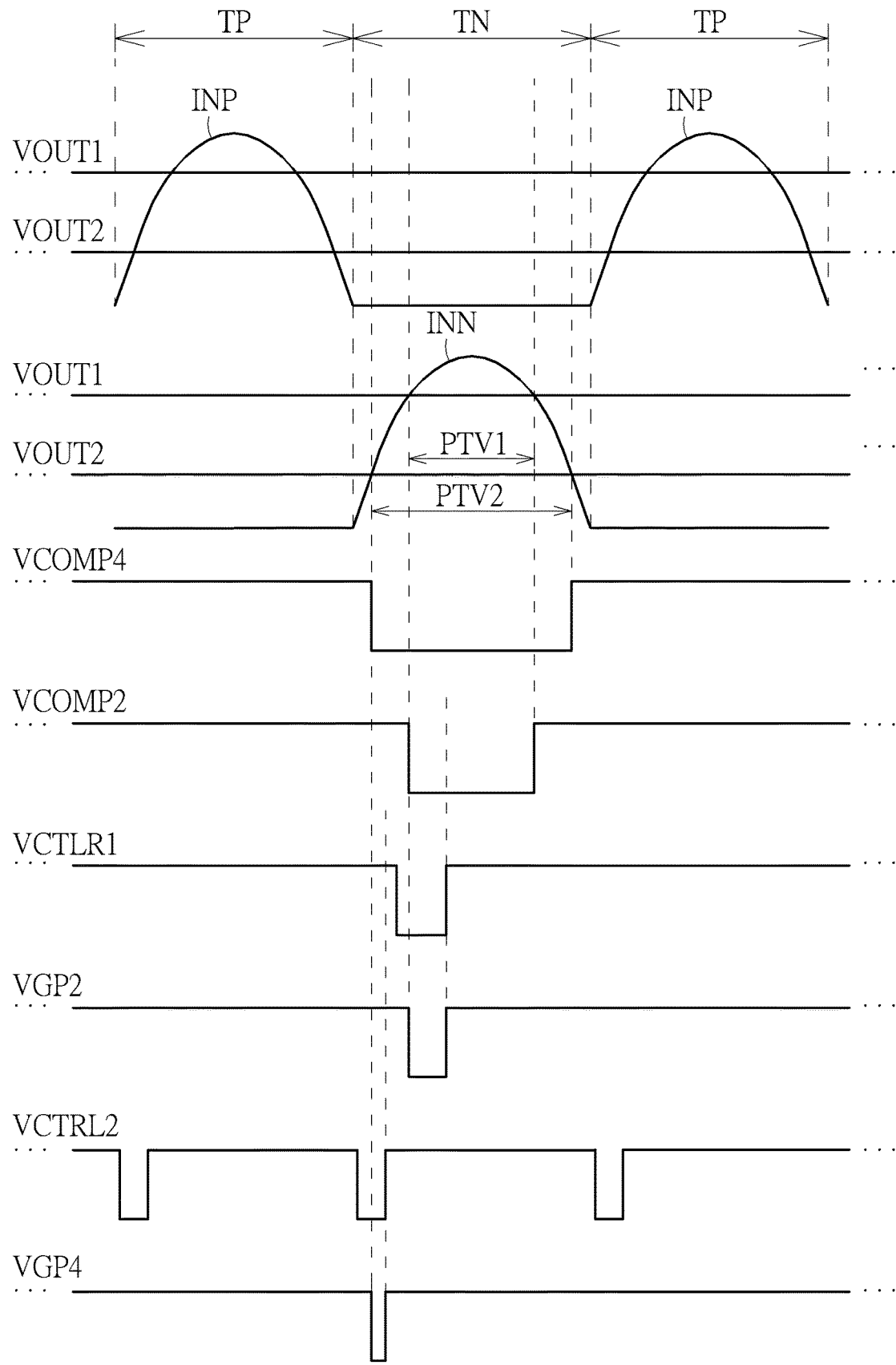
FIG. 3 is a timing diagram illustrating operation of the multiple output rectifier within a negative half period of the alternating current input voltage.

Please refer to FIG. 3. FIG. 3 is a timing diagram illustrating operation of the multiple output rectifier 100 within a negative half period TN of the alternating current input voltage VIN. As shown in FIG. 3, when a direct current voltage INN (wherein the direct current voltage INN is a voltage signal generated by the alternating current input voltage VIN being rectified by the half-wave method or the full-wave method) corresponding to the negative half period TN of the alternating current input voltage VIN is greater than the output voltage VOUT2, the fourth comparator 10302 generates a comparison signal VCOMP4, and then the fourth logic circuit 10304 can execute the logic operation on the comparison signal VCOMP4 and the control signal VCTRL2 to generate a turning-on signal VGP4, wherein the comparison signal VCOMP4 corresponds to the predetermined time interval PTV2 within the negative half period TN of the alternating current input voltage VIN. In addition, the fourth logic circuit 10304 is also an OR gate, and the logic operation executed by the fourth logic circuit 10304 is also "OR" operation. As shown in FIG. 1, after the fourth logic circuit 10304 generates the turning-on signal VGP4, the fourth P-type metal-oxide-semiconductor transistor 10228 can be turned on according to the turning-on signal VGP4, wherein when the fourth P-type metal-oxide-semiconductor transistor 10228 is turned on according to the turning-on signal VGP4, the fourth P-type metal-oxide-semiconductor transistor 10228 and the first N-type metal-oxide-semiconductor transistor 10230 of the comparator-based circuit 1022 can provide a corresponding current path to charge the second capacitor 108, resulting in the comparator-based circuit 1022 generating and outputting the output voltage VOUT2 within turning-on of the fourth P-type metal-oxide-semiconductor transistor 10228. In addition, subsequent operational principles of the turning-on circuit 1030 are the same as those of the turning-on circuit 1028, so further description thereof is omitted for simplicity.

As shown in FIG. 3, when the direct current voltage INN is greater than the output voltage VOUT1, the second comparator 10262 generates a comparison signal VCOMP2, and then the second logic circuit 10264 can execute the logic operation on the comparison signal VCOMP2 and the control signal VCTRL1 to generate a turning-on signal VGP2, wherein the comparison signal VCOMP2 corresponds to the predetermined time interval PTV1 within the negative half period TN of the alternating current input voltage VIN. In addition, the second logic circuit 10264 is also an OR gate, and the logic operation executed by the second logic circuit 10264 is also "OR" operation. As shown in FIG. 1, after the second logic circuit 10264 generates the turning-on signal VGP2, the second P-type metal-oxide-semiconductor transistor 10224 can be turned on according to the turning-on signal VGP2, wherein when the second P-type metal-oxide-semiconductor transistor 10224 is turned on according to the turning-on signal VGP2, the second P-type metal-oxide-semiconductor transistor 10224 and the first N-type metal-oxide-semiconductor transistor 10230 of the comparator-based circuit 1022 can also provide a corresponding current path to charge the first capacitor 110, resulting in the comparator-based circuit 1022 generating and outputting the output voltage VOUT1 within turning-on of the second P-type metal-oxide-semiconductor transistor 10224. In addition, subsequent operational principles of the turning-on circuit 1026 are the same as those of the turning-on circuit 1024, so further description thereof is omitted for simplicity.

As shown in FIG. 3, the user can control turning-on time of the second P-type metal-oxide-semiconductor transistor 10224 through the width of the predetermined time interval PTV1 (because the comparison signal VCOMP2 corresponds to the predetermined time interval PTV1) and the width of the control signal VCTRL1; and similarly, the user can also control turning-on time of the fourth P-type metal-oxide-semiconductor transistor 10228 through the width of the predetermined time interval PTV2 (because the comparison signal VCOMP4 corresponds to the predetermined time interval PTV2) and the width of the control signal VCTRL2. In addition, the present invention is also not limited to the second logic circuit 10264 and the fourth logic circuit 10304 being OR gates. That is to say, any configuration in which the second logic circuit 10264 and the fourth logic circuit 10304 can make the turning-on signal VGP2 and the turning-on signal VGP4 be not overlapped each other falls within the scope of the present invention.

In addition, as shown in FIG. 2, the active rectification circuit 102 generates and outputs the output voltage VOUT1, VOUT2 within the same half period (i.e. within the positive half period TP) of the alternating current input voltage VIN, or as shown in FIG. 3, the active rectification circuit 102 generates and outputs the output voltage VOUT1, VOUT2 within another same half period (i.e. within the negative half period TN) of the alternating current input voltage VIN.

Figure 4:
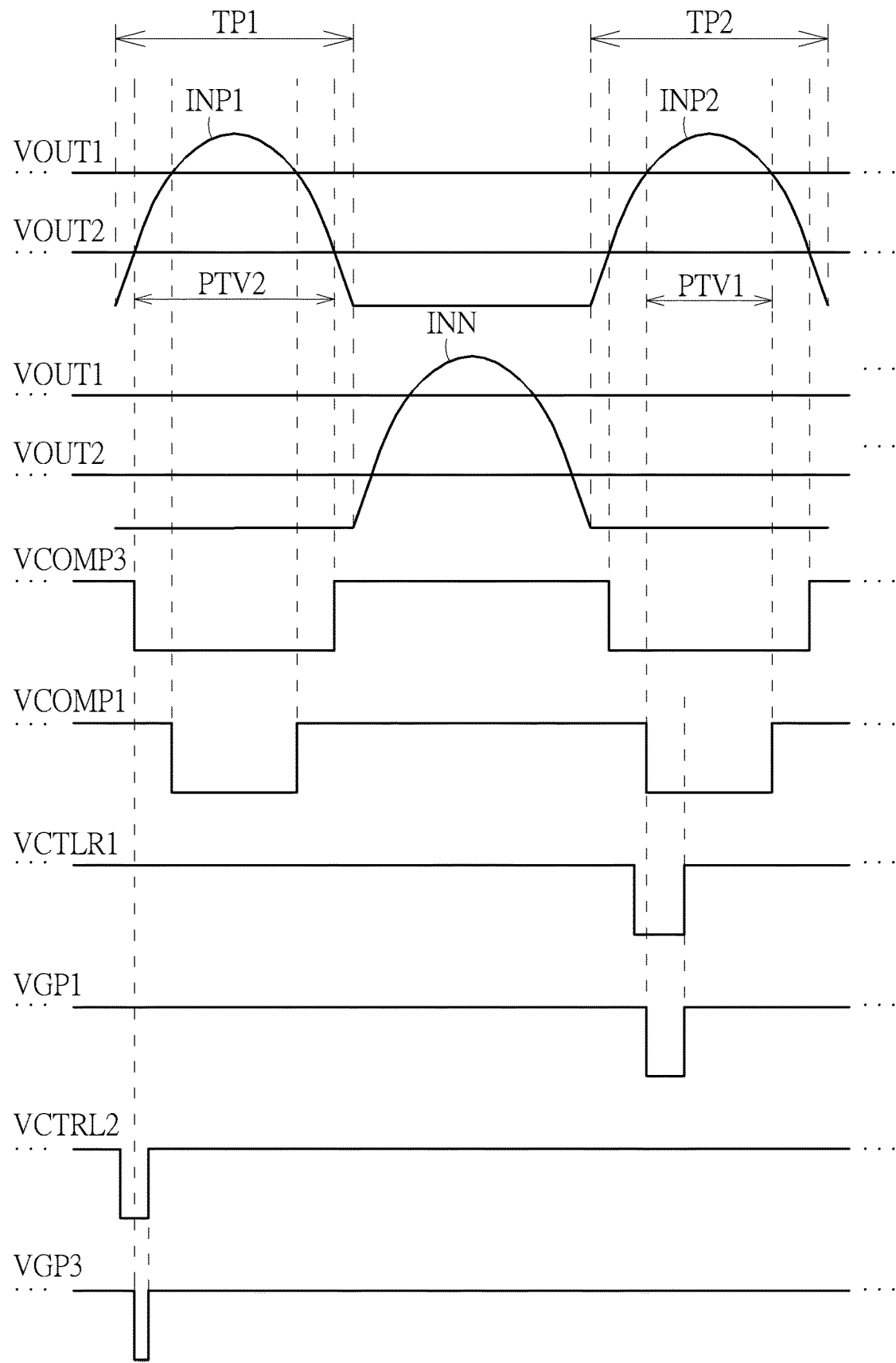
FIG. 4 is a timing diagram illustrating the active rectification circuit outputting the output voltage within a first positive half period of the alternating current input voltage and outputting the output voltage within a second positive half period of the alternating current input voltage according to another embodiment of the present invention.

Please refer to FIG. 4. FIG. 4 is a timing diagram illustrating the active rectification circuit 102 outputting the output voltage VOUT2 within a first positive half period TP1 of the alternating current input voltage VIN and outputting the output voltage VOUT1 within a second positive half period TP2 of the alternating current input voltage VIN according to another embodiment of the present invention, wherein the first positive half period TP1 and the second positive half period TP2 are consecutive positive half periods of the alternating current input voltage VIN. As shown in FIG. 4, when a direct current voltage INP1 (wherein the direct current voltage INP1 is a voltage signal generated by the alternating current input voltage VIN being rectified by the half-wave method or the full-wave method) corresponding to the first positive half period TP1 of the alternating current input voltage VIN is greater than the output voltage VOUT2, the third comparator 10282 generates the comparison signal VCOMP3, and then the third logic circuit 10284 can execute the logic operation on the comparison signal VCOMP3 and the control signal VCTRL2 corresponding to the output voltage VOUT2 to generate the turning-on signal VGP3, wherein the comparison signal VCOMP3 corresponds to the predetermined time interval PTV2 within the first positive half period TP1 of the alternating current input voltage VIN. As shown in FIG. 1, after the third logic circuit 10284 generates the turning-on signal VGP3, the third P-type metal-oxide-semiconductor transistor 10226 can be turned on according to the turning-on signal VGP3, wherein when the third P-type metal-oxide-semiconductor transistor 10226 is turned on according to the turning-on signal VGP3, the comparator-based circuit 1022 can generate and output the output voltage VOUT2. In addition, as shown in FIG. 4, when a direct current voltage INP2 (wherein the direct current voltage INP2 is a voltage signal generated by the alternating current input voltage VIN being rectified by the half-wave method or the full-wave method) corresponding to the second positive half period TP2 of the alternating current input voltage VIN2 is greater than the output voltage VOUT1, the first comparator 10242 generates the comparison signal VCOMP1, and then the first logic circuit 10244 can execute the logic operation on the comparison signal VCOMP1 and the control signal VCTRL1 corresponding to the output voltage VOUT1 to generate the turning-on signal VGP1, wherein the comparison signal VCOMP1 corresponds to the predetermined time interval PTV1 within the second positive half period TP2 of the alternating current input voltage VIN. As shown in FIG. 1, after the first logic circuit 10244 generates the turning-on signal VGP1, the first P-type metal-oxide-semiconductor transistor 10222 can be turned on according to the turning-on signal VGP1, wherein when the first P-type metal-oxide-semiconductor transistor 10222 is turned on according to the turning-on signal VGP1, the comparator-based circuit 1022 can generate and output the output voltage VOUT1.

As shown in FIG. 4, the user can control the turning-on time of the first P-type metal-oxide-semiconductor transistor 10222 through the width of the predetermined time interval PTV1 (because the comparison signal VCOMP1 corresponds to the predetermined time interval PTV1) and the width of the control signal VCTRL1; and similarly, the user can also control turning-on time of the third P-type metal-oxide-semiconductor transistor 10226 through the width of the predetermined time interval PTV2 (because the comparison signal VCOMP3 corresponds to the predetermined time interval PTV2) and the width of the control signal VCTRL2.

Figure 5:
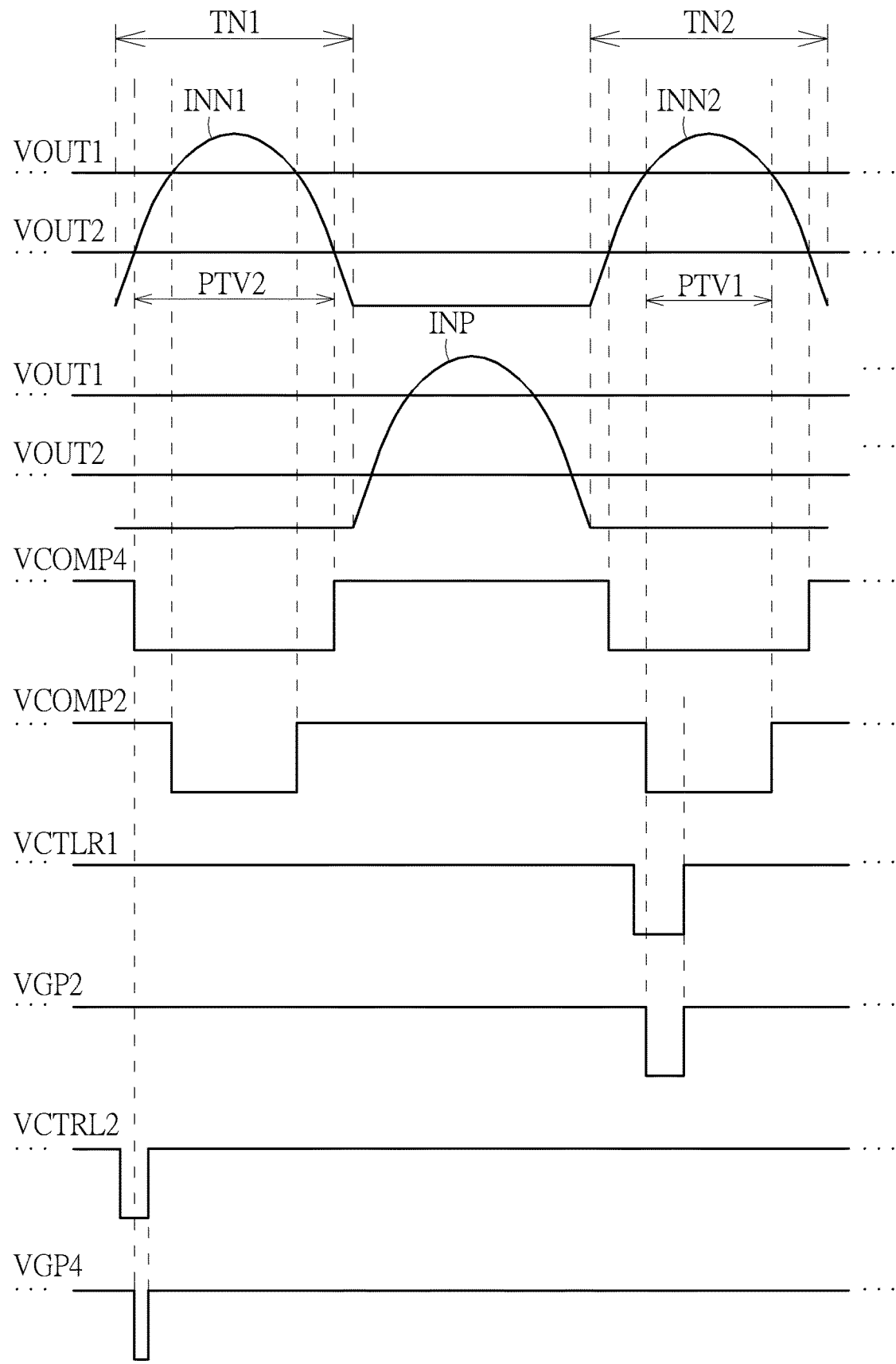
FIG. 5 is a timing diagram illustrating the active rectification circuit outputting the output voltage within a first negative half period of the alternating current input voltage and outputting the output voltage within a second negative half period of the alternating current input voltage according to another embodiment of the present invention.

Please refer to FIG. 5. FIG. 5 is a timing diagram illustrating the active rectification circuit 102 outputting the output voltage VOUT2 within a first negative half period TN1 of the alternating current input voltage VIN and outputting the output voltage VOUT1 within a second negative half period TN2 of the alternating current input voltage VIN according to another embodiment of the present invention, wherein the first negative half period TN1 and the second negative half period TN2 are consecutive negative half periods of the alternating current input voltage VIN. As shown in FIG. 5, when a direct current voltage INN1 (wherein the direct current voltage INN1 is a voltage signal generated by the alternating current input voltage VIN being rectified by the half-wave method or the full-wave method) corresponding to the first negative half period TN1 of the alternating current input voltage VIN is greater than the output voltage VOUT2, the fourth comparator 10302 generates the comparison signal VCOMP4, and then the fourth logic circuit 10304 can execute the logic operation on the comparison signal VCOMP4 and the control signal VCTRL2 to generate the turning-on signal VGP4, wherein the comparison signal VCOMP4 corresponds to the predetermined time interval PTV2 within the first negative half period TN1 of the alternating current input voltage VIN. As shown in FIG. 1, after the fourth logic circuit 10304 generates the turning-on signal VGP4, the fourth P-type metal-oxide-semiconductor transistor 10228 can be turned on according to the turning-on signal VGP4, wherein when the fourth P-type metal-oxide-semiconductor transistor 10228 is turned on according to the turning-on signal VGP4, the comparator-based circuit 1022 can generate and output the output voltage VOUT2. In addition, as shown in FIG. 5, when a direct current voltage INN2 (wherein the direct current voltage INN2 is a voltage signal generated by the alternating current input voltage VIN being rectified by the half-wave method or the full-wave method) corresponding to the second negative half period TN2 of the alternating current input voltage VIN is greater than the output voltage VOUT1, the second comparator 10262 generates the comparison signal VCOMP2, and then the second logic circuit 10264 can execute the logic operation on the comparison signal VCOMP2 and the control signal VCTRL1 to generate the turning-on signal VGP2, wherein the comparison signal VCOMP2 corresponds to the predetermined time interval PTV1 within the second negative half period TN2 of the alternating current input voltage VIN. As shown in FIG. 1, after the second logic circuit 10264 generates the turning-on signal VGP2, the second P-type metal-oxide-semiconductor transistor 10224 can be turned on according to the turning-on signal VGP2, wherein when the second P-type metal-oxide-semiconductor transistor 10224 is turned on according to the turning-on signal VGP2, the comparator-based circuit 1022 can generate and output the output voltage VOUT1.

As shown in FIG. 5, the user can control the turning-on time of the second P-type metal-oxide-semiconductor transistor 10224 through the width of the predetermined time interval PTV1 (because the comparison signal VCOMP2 corresponds to the predetermined time interval PTV1) and the width of the control signal VCTRL1; and similarly, the user can also control turning-on time of the fourth P-type metal-oxide-semiconductor transistor 10228 through the width of the predetermined time interval PTV2 (because the comparison signal VCOMP4 corresponds to the predetermined time interval PTV2) and the width of the control signal VCTRL2.

In addition, as shown in FIG. 4, the active rectification circuit 102 generates and outputs the output voltage VOUT2 within the first positive half period TP1 (that is, an exclusive half period of the alternating current input voltage VIN corresponding to the output voltage VOUT2) of the alternating current input voltage VIN, and generates and outputs the output voltage VOUT1 within the second positive half period TP2 (that is, an exclusive half period of the alternating current input voltage VIN corresponding to the output voltage VOUT1) of the alternating current input voltage VIN; and as shown in FIG. 5, the active rectification circuit 102 generates and outputs the output voltage VOUT2 within the first negative half period TN1 (that is, an exclusive half period of the alternating current input voltage VIN corresponding to the output voltage VOUT2) of the alternating current input voltage VIN, and generates and outputs the output voltage VOUT1 within the second negative half period TN2 (that is, an exclusive half period of the alternating current input voltage VIN corresponding to the output voltage VOUT1) of the alternating current input voltage VIN.

Figure 6:
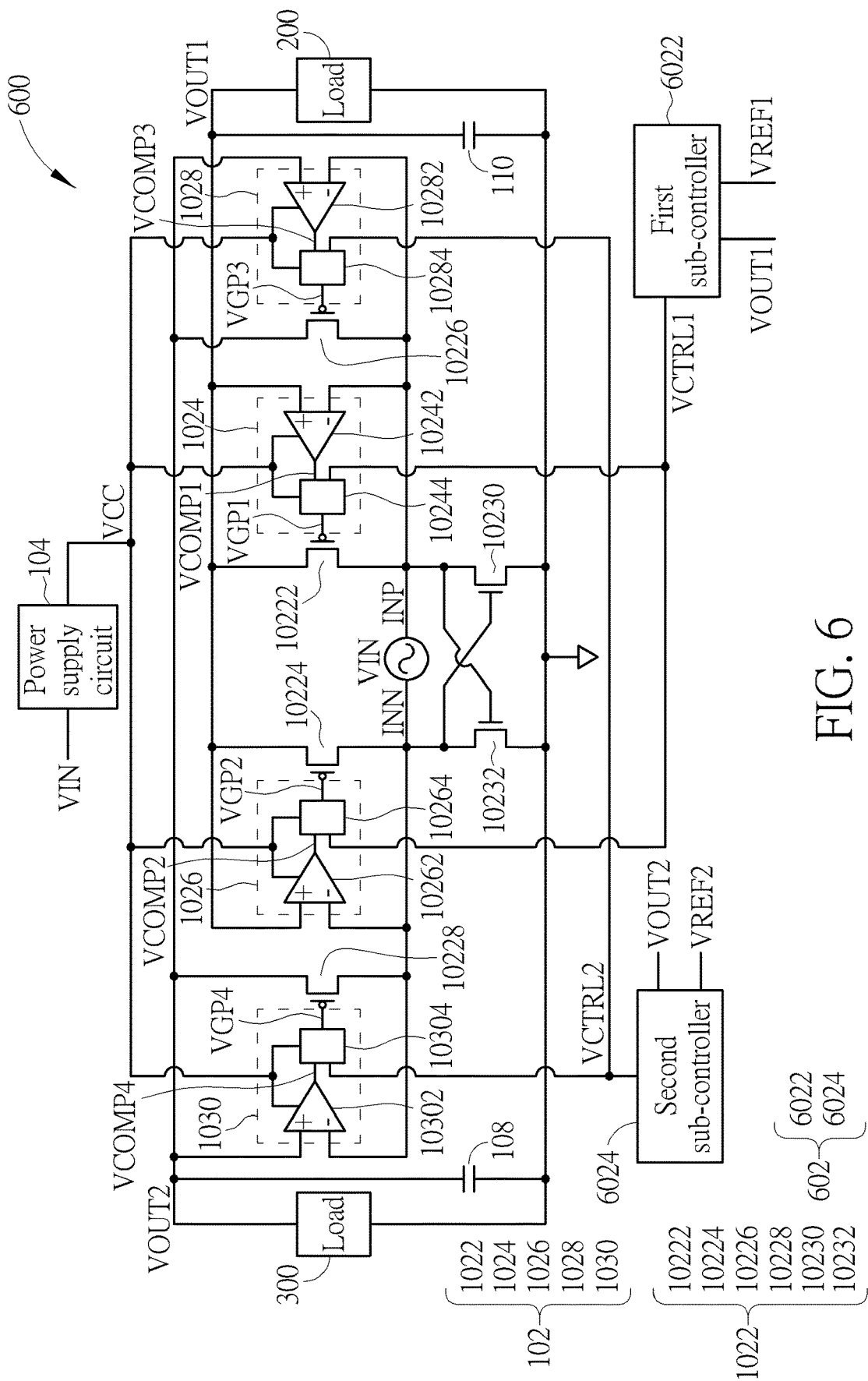
FIG. 6 is a diagram illustrating a multiple output rectifier according to a second embodiment of the present invention.

Please refer to FIG. 6. FIG. 6 is a diagram illustrating a multiple output rectifier 600 according to a second embodiment of the present invention. As shown in FIG. 6, a controller 602 of the multiple output rectifier 600 includes a first sub-controller 6022 and a second sub-controller 6024, so differences between the multiple output rectifier 600 and the multiple output rectifier 100 are that the first sub-controller 6022 generates a control signal VCTRL1 corresponding to the output voltage VOUT1 according to a first reference voltage VREF1 and the output voltage VOUT1, and the second sub-controller 6024 generates a control signal VCTRL2 corresponding to the output voltage VOUT2 according to a second reference voltage VREF2 and the output voltage VOUT2, wherein the first sub-controller 6022 and the second sub-controller 6024 are pulse width modulation (PWM) controllers or pulse frequency modulation (PFM) controllers, and operational principles of the control signal VCTRL1 generated by the first sub-controller 6022 and the control signal VCTRL2 of the second sub-controller 6024 can be referred to FIGS. 2-5, so further description thereof is omitted for simplicity. As shown in FIG. 6, because the first sub-controller 6022 generates the control signal VCTRL1 according to the first reference voltage VREF1 and the output voltage VOUT1, the multiple output rectifier 600 can control width of the control signal VCTRL1 through the first reference voltage VREF1. That is to say, the multiple output rectifier 600 can control the turning-on time of the first P-type metal-oxide-semiconductor transistor 10222 and the turning-on time of the second P-type metal-oxide-semiconductor transistor 10224 through the first reference voltage VREF1; and similarly, the multiple output rectifier 600 can also control the turning-on time of the third P-type metal-oxide-semiconductor transistor 10226 and the turning-on time of the fourth P-type metal-oxide-semiconductor transistor 10228 through the second reference voltage VREF2. In addition, subsequent operational principles of the multiple output rectifier 600 are the same as those of the multiple output rectifier 100, so further description thereof is omitted for simplicity.

Figure 7:
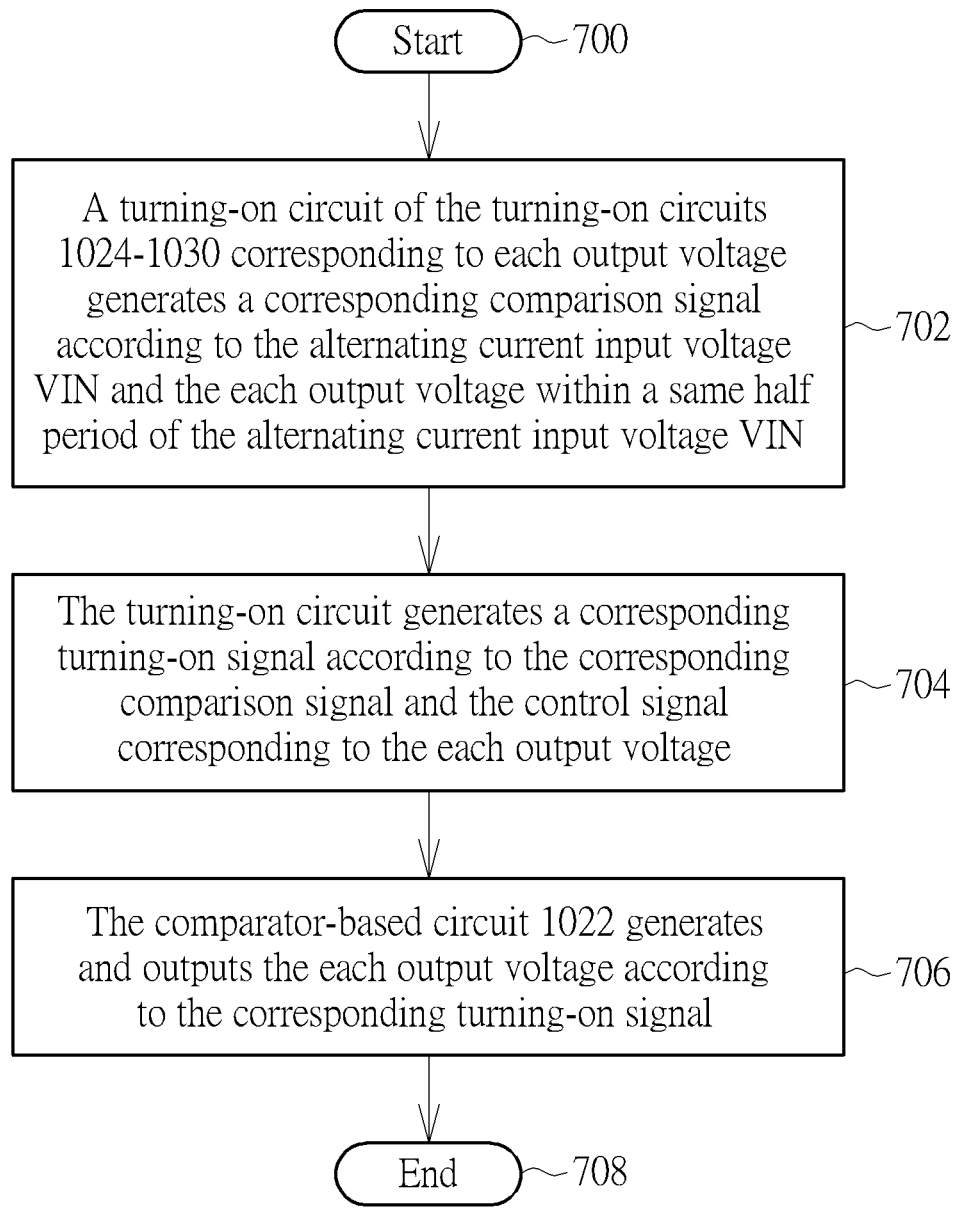
FIG. 7 is a flowchart illustrating an operation method of a multiple output rectifier according to a third embodiment of the present invention.

Please refer to FIGS. 1-3 and FIG. 7. FIG. 7 is a flowchart illustrating an operation method of a multiple output rectifier according to a third embodiment of the present invention. The operation method in FIG. 7 is illustrated using the multiple output rectifier 100 in FIG. 1. Detailed steps are as follows:

Step 700: Start.

Step 702: A turning-on circuit of the turning-on circuits 1024-1030 corresponding to each output voltage generates a corresponding comparison signal according to the alternating current input voltage VIN and the each output voltage within a same half period of the alternating current input voltage VIN.

Step 704: The turning-on circuit generates a corresponding turning-on signal according to the corresponding comparison signal and the control signal corresponding to the each output voltage.

Step 706: The comparator-based circuit 1022 generates and outputs the each output voltage according to the corresponding turning-on signal.

Step 708: End.

Taking the multiple output rectifier 100 outputting the output voltage VOUT2 as an example, in Step 702, as shown in FIG. 2, when the direct current voltage INP is greater than the output voltage VOUT2, the third comparator 10282 (corresponding to the output voltage VOUT2) of the turning-on circuit 1028 generates the comparison signal VCOMP3. Then, in Step 704, the third logic circuit 10284 of the turning-on circuit 1028 can execute the logic operation on the comparison signal VCOMP3 and the control signal VCTRL2 corresponding to the output voltage VOUT2 to generate the turning-on signal VGP3, wherein the control signal VCTRL2 is generated by the controller 106, and the comparison signal VCOMP3 corresponds to the predetermined time interval PTV2 within the positive half period TP of the alternating current input voltage VIN. In Step 706, as shown in FIG. 1, after the third logic circuit 10284 generates the turning-on signal VGP3, the third P-type metal-oxide-semiconductor transistor 10226 of the comparator-based circuit 1022 can be turned on according to the turning-on signal VGP3, wherein when the third P-type metal-oxide-semiconductor transistor 10226 is turned on according to the turning-on signal VGP3, the third P-type metal-oxide-semiconductor transistor 10226 and the second N-type metal-oxide-semiconductor transistor 10232 of the comparator-based circuit 1022 can provide a corresponding current path to charge the second capacitor 108 of the multiple output rectifier 100, resulting in the comparator-based circuit 1022 generating and outputting the output voltage VOUT2 during turning-on of the third P-type metal-oxide-semiconductor transistor 10226. In addition, the present invention is not limited to the third comparator 10282 generating the comparison signal VCOMP3 when the direct current voltage INP is greater than the output voltage VOUT2. That is to say, in another embodiment of the present invention, the third comparator 10282 generates the comparison signal VCOMP3 when the direct current voltage INP is less than the output voltage VOUT2, and then the third logic circuit 10284 executes the logic operation on the inverse comparison signal $\overline{VCOMP3}$ and the control signal VCTRL2 to generate the turning-on signal VGP3.

Taking the multiple output rectifier 100 outputting the output voltage VOUT1 as an example, in Step 702, as shown in FIG. 2, when the direct current voltage INP is greater than the output voltage VOUT1, the first comparator 10242

(corresponding to the output voltage VOUT1) of the turning-on circuit 1024 generates the comparison signal VCOMP1. Then, in Step 704, the first logic circuit 10244 of the turning-on circuit 1024 can execute the logic operation on the comparison signal VCOMP1 and the control signal VCTRL1 corresponding to the output voltage VOUT1 to generate the turning-on signal VGP1, wherein the control signal VCTRL1 is generated by the controller 106, and the comparison signal VCOMP1 corresponds to the predetermined time interval PTV1 within the positive half period TP of the alternating current input voltage VIN. In Step 706, as shown in FIG. 1, after the first logic circuit 10244 generates the turning-on signal VGP1, the first P-type metal-oxide-semiconductor transistor 10222 of the comparator-based circuit 1022 can be turned on according to the turning-on signal VGP1, wherein when the first P-type metal-oxide-semiconductor transistor 10222 is turned on according to the turning-on signal VGP1, the first P-type metal-oxide-semiconductor transistor 10222 and the second N-type metal-oxide-semiconductor transistor 10232 of the comparator-based circuit 1022 can also provide a corresponding current path to charge the first capacitor 110 of the multiple output rectifier 100, resulting in the comparator-based circuit 1022 generating and outputting the output voltage VOUT1 during turning-on of the first P-type metal-oxide-semiconductor transistor 10222. In addition, the present invention is not limited to the first comparator 10242 generating the comparison signal VCOMP1 when the direct current voltage INP is greater than the output voltage VOUT1. That is to say, in another embodiment of the present invention, the first comparator 10242 generates the comparison signal VCOMP1 when the direct current voltage INP is less than output voltage VOUT1, and then the first logic circuit 10244 executes the logic operation on the inverse comparison signal $\overline{VCOMP1}$ and the control signal VCTRL1 to generate the turning-on signal VGP1.

Therefore, as shown in FIG. 2, the active rectification circuit 102 generates and outputs the output voltage VOUT1, VOUT2 within the same half period (i.e. within the positive half period TP) of the alternating current input voltage VIN. In addition, as shown in FIG. 3, the active rectification circuit 102 can also generate and output the output voltage VOUT1, VOUT2 within another same half period (i.e. within the negative half period TN) of the alternating current input voltage VIN, so further description thereof is omitted for simplicity.

Figure 8:
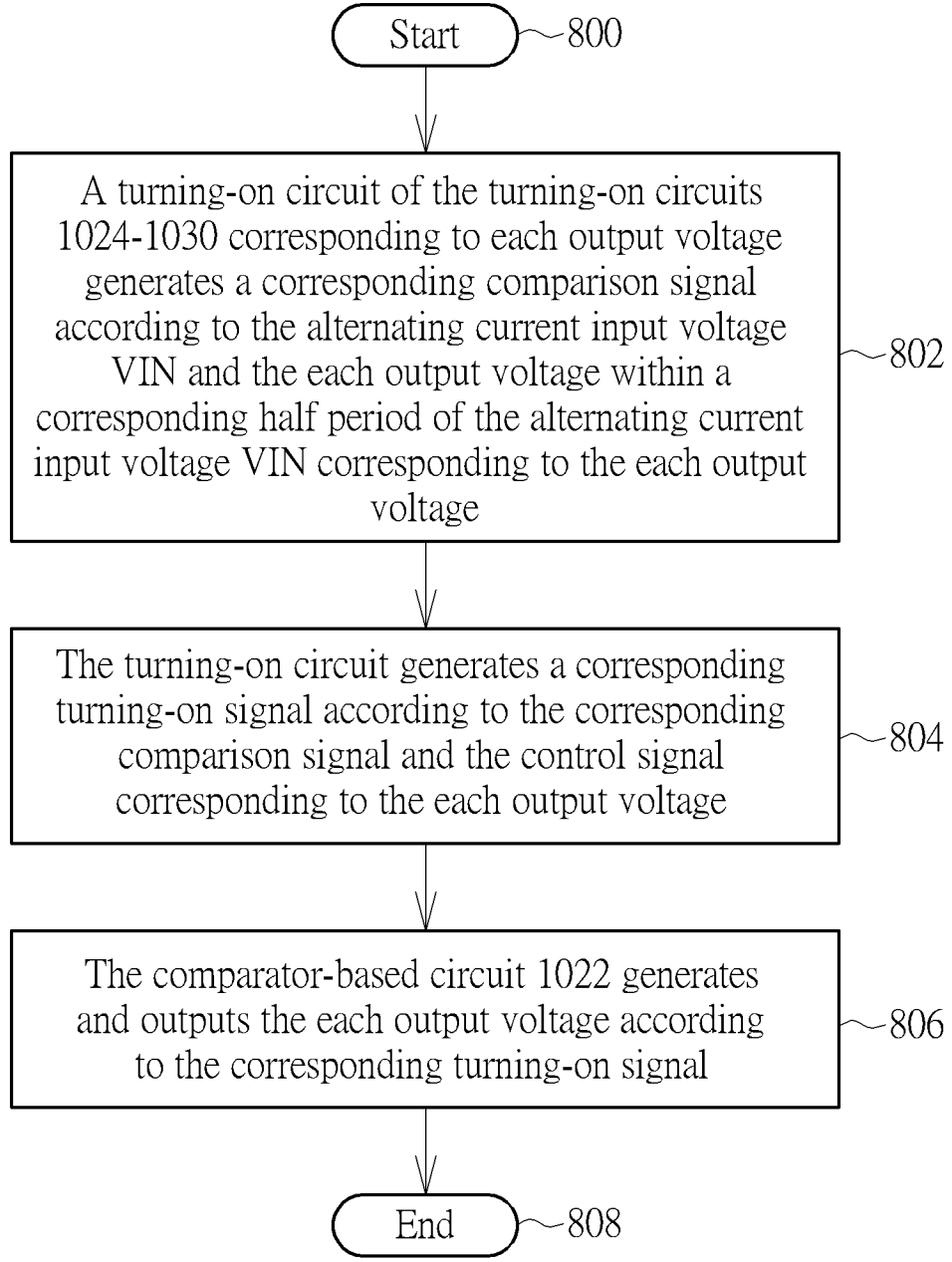
FIG. 8 is a flowchart illustrating an operation method of a multiple output rectifier according to a fourth embodiment of the present invention.

Please refer to FIGS. 1, 4, 5, 8. FIG. 8 is a flowchart illustrating an operation method of a multiple output rectifier according to a fourth embodiment of the present invention. The operation method in FIG. 8 is illustrated using the multiple output rectifier 100 in FIG. 1. Detailed steps are as follows:

Step 800: Start.

Step 802: A turning-on circuit of the turning-on circuits 1024-1030 corresponding to each output voltage generates a corresponding comparison signal according to the alternating current input voltage VIN and the each output voltage within a corresponding half period of the alternating current input voltage VIN corresponding to the each output voltage.

Step 804: The turning-on circuit generates a corresponding turning-on signal according to the corresponding comparison signal and the control signal corresponding to the each output voltage.

Step 806: The comparator-based circuit 1022 generates and outputs the each output voltage according to the corresponding turning-on signal.

Step 808: End.

Taking the multiple output rectifier 100 outputting the output voltage VOUT2 as an example, in Step 802, as shown in FIG. 4, when the direct current voltage INP1 is greater than the output voltage VOUT2, the third comparator 10282 (corresponding to the output voltage VOUT2) of the turning-on circuit 1028 generates the comparison signal VCOMP3. Then, in Step 804, the third logic circuit 10284 of the turning-on circuit 1028 can execute the logic operation on the comparison signal VCOMP3 and the control signal VCTRL2 corresponding to the output voltage VOUT2 to generate the turning-on signal VGP3, wherein the comparison signal VCOMP3 corresponds to the predetermined time interval PTV2 within the first positive half period TP1 of the alternating current input voltage VIN. In Step 806, as shown in FIG. 1, after the third logic circuit 10284 generates the turning-on signal VGP3, the third P-type metal-oxide-semiconductor transistor 10226 of the comparator-based circuit 1022 can be turned on according to the turning-on signal VGP3, wherein when the third P-type metal-oxide-semiconductor transistor 10226 is turned on according to the turning-on signal VGP3, the comparator-based circuit 1022 can generate and output the output voltage VOUT2.

In addition, take the multiple output rectifier 100 outputting the output voltage VOUT1 as an example. In Step 802, as shown in FIG. 4, when the direct current voltage INP2 is greater than the output voltage VOUT1, the first comparator 10242 (corresponding to the output voltage VOUT1) of the turning-on circuit 1024 generates the comparison signal VCOMP1. Then, in Step 804, the first logic circuit 10244 of the turning-on circuit 1024 can execute the logic operation on the comparison signal VCOMP1 and the control signal VCTRL1 corresponding to the output voltage VOUT1 to generate the turning-on signal VGP1, wherein the comparison signal VCOMP1 corresponds to the predetermined time interval PTV1 within the second positive half period TP2 of the alternating current input voltage VIN. In Step 806, as shown in FIG. 1, after the first logic circuit 10244 generates the turning-on signal VGP1, the first P-type metal-oxide-semiconductor transistor 10222 of the comparator-based circuit 1022 can be turned on according to the turning-on signal VGP1, wherein when the first P-type metal-oxide-semiconductor transistor 10222 is turned on according to the turning-on signal VGP1, the comparator-based circuit 1022 can generate and output the output voltage VOUT1.

Taking the multiple output rectifier 100 outputting the output voltage VOUT2 as an example, in Step 802, as shown in FIG. 5, when the direct current voltage INN1 is greater than the output voltage VOUT2, the fourth comparator 10302 (corresponding to the output voltage VOUT2) of the turning-on circuit 1030 generates the comparison signal VCOMP4. Then, in Step 804, the fourth logic circuit 10304 of the turning-on circuit 1030 can execute the logic operation on the comparison signal VCOMP4 and the control signal VCTRL2 to generate the turning-on signal VGP4, wherein the comparison signal VCOMP4 corresponds to the predetermined time interval PTV2 within the first negative half period TN1 of the alternating current input voltage VIN. In Step 806, as shown in FIG. 1, after the fourth logic circuit 10304 generates the turning-on signal VGP4, the fourth P-type metal-oxide-semiconductor transistor 10228 of the comparator-based circuit 1022 can be turned on according to the turning-on signal VGP4, wherein when the fourth P-type metal-oxide-semiconductor transistor 10228 is turned on according to the turning-on signal VGP4, the comparator-based circuit 1022 can generate and output the output voltage VOUT2.

In addition, take the multiple output rectifier 100 outputting the output voltage VOUT1 as an example. In Step 802, as shown in FIG. 5, when the direct current voltage INN2 is greater than the output voltage VOUT1, the second comparator 10262 (corresponding to the output voltage VOUT1) of the turning-on circuit 1026 generates the comparison signal VCOMP2. Then, in Step 804, the second logic circuit 10264 of the turning-on circuit 1026 can execute the logic operation on the comparison signal VCOMP2 and the control signal VCTRL1 to generate the turning-on signal VGP2, wherein the comparison signal VCOMP2 corresponds to the predetermined time interval PTV1 within the second negative half period TN2 of the alternating current input voltage VIN. In Step 806, as shown in FIG. 1, after the second logic circuit 10264 generates the turning-on signal VGP2, the second P-type metal-oxide-semiconductor transistor 10224 of the comparator-based circuit 1022 can be turned on according to the turning-on signal VGP2, wherein when the second P-type metal-oxide-semiconductor transistor 10224 is turned on according to the turning-on signal VGP2, the comparator-based circuit 1022 can generate and output the output voltage VOUT1.

Therefore, as shown in FIG. 4, the active rectification circuit 102 generates and outputs the output voltage VOUT2 within the first positive half period TP1 (that is, an exclusive half period of the alternating current input voltage VIN corresponding to the output voltage VOUT2) of the alternating current input voltage VIN, and generates and outputs the output voltage VOUT1 within the second positive half period TP2 (that is, an exclusive half period of the alternating current input voltage VIN corresponding to the output voltage VOUT1) of the alternating current input voltage VIN; and as shown in FIG. 5, the active rectification circuit 102 generates and outputs the output voltage VOUT2 within the first negative half period TN1 (that is, an exclusive half period of the alternating current input voltage VIN corresponding to the output voltage VOUT2) of the alternating current input voltage VIN, and generates and outputs the output voltage VOUT1 within the second negative half period TN2 (that is, an exclusive half period of the alternating current input voltage VIN corresponding to the output voltage VOUT1) of the alternating current input voltage VIN.

Figure 9:
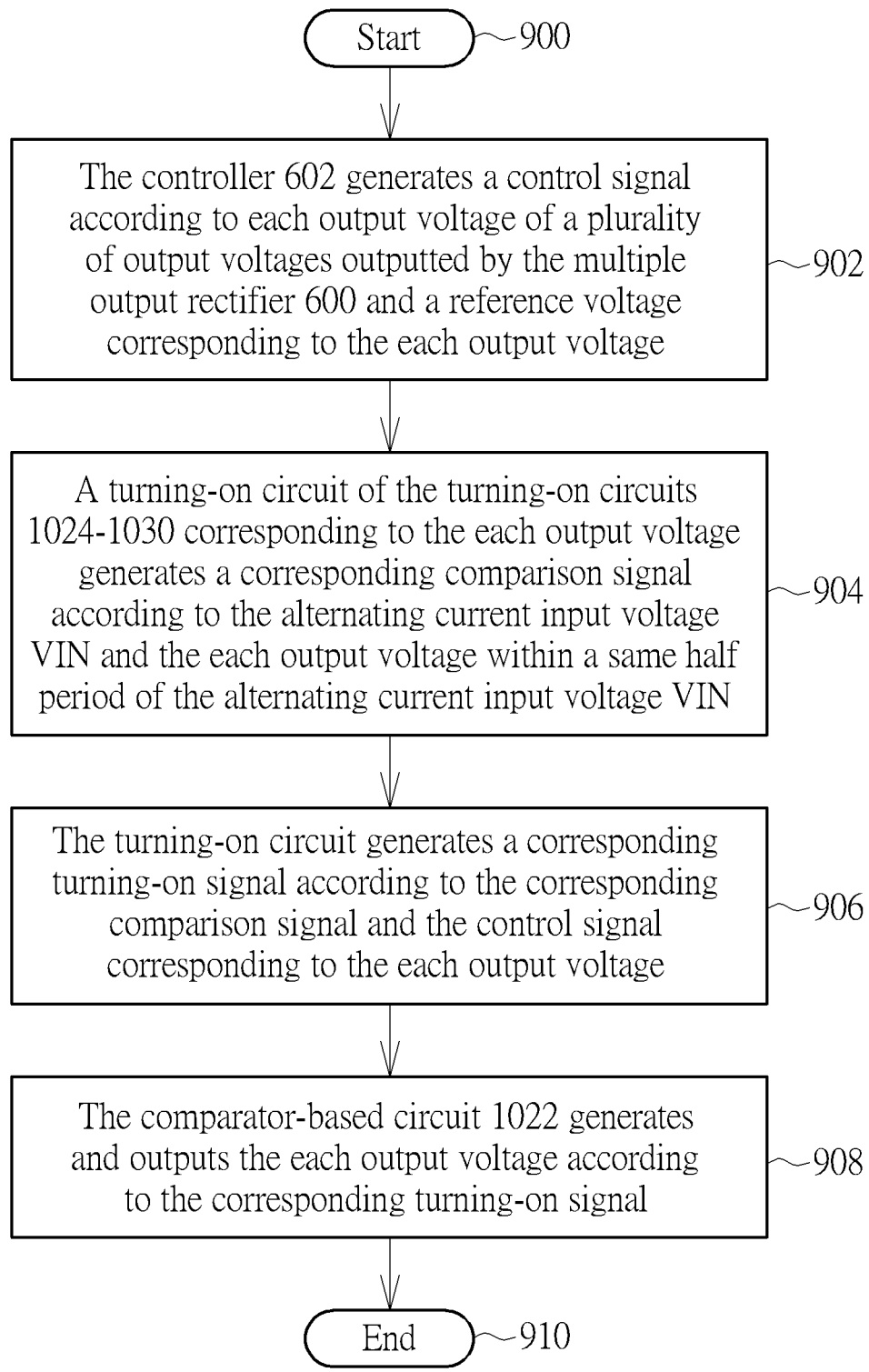
FIG. 9 is a flowchart illustrating an operation method of a multiple output rectifier according to a fifth embodiment of the present invention.

Please refer to FIGS. 2, 3, 6, 9. FIG. 9 is a flowchart illustrating an operation method of a multiple output rectifier according to a fifth embodiment of the present invention. The operation method in FIG. 9 is illustrated using the multiple output rectifier 600 in FIG. 6. Detailed steps are as follows:

Step 900: Start.

Step 902: The controller 602 generates a control signal according to each output voltage of a plurality of output voltages outputted by the multiple output rectifier 600 and a reference voltage corresponding to the each output voltage.

Step 904: A turning-on circuit of the turning-on circuits 1024-1030 corresponding to the each output voltage generates a corresponding comparison signal according to the alternating current input voltage VIN and the each output voltage within a same half period of the alternating current input voltage VIN.

Step 906: The turning-on circuit generates a corresponding turning-on signal according to the corresponding comparison signal and the control signal corresponding to the each output voltage.

Step 908: The comparator-based circuit 1022 generates and outputs the each output voltage according to the corresponding turning-on signal.

Step 910: End.

A difference between the embodiment in FIG. 9 and the embodiment in FIG. 7 is that in Step 902, as shown in FIG. 6, the first sub-controller 6022 of the controller 602 generates the control signal VCTRL1 corresponding to the output voltage VOUT1 according to the first reference voltage VREF1 and the output voltage VOUT1, and the second sub-controller 6024 of the controller 602 generates the control signal VCTRL2 corresponding to the output voltage VOUT2 according to the second reference voltage VREF2 and the output voltage VOUT2, wherein operational principles of the control signal VCTRL1 generated by the first sub-controller 6022 and the control signal VCTRL2 generated by the second sub-controller 6024 in the embodiment in FIG. 9 can be referred to FIGS. 2, 3, so further description thereof is omitted for simplicity. In addition, subsequent operational principles of the embodiment in FIG. 9 are the same as those of the embodiment in FIG. 7, so further description thereof is omitted for simplicity.

Figure 10:
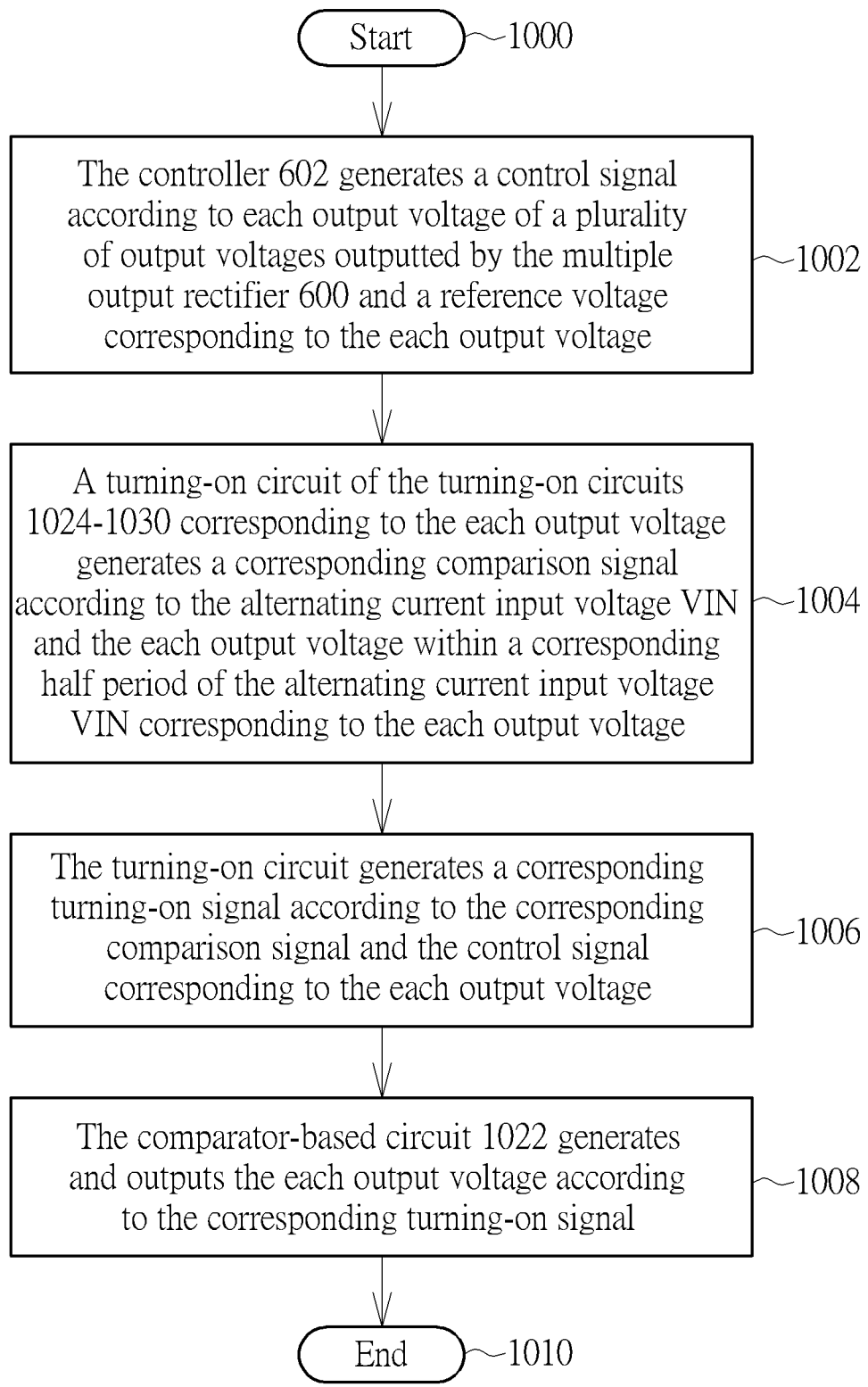
FIG. 10 is a flowchart illustrating an operation method of a multiple output rectifier according to a sixth embodiment of the present invention.

Please refer to FIGS. 4, 5, 6, 10. FIG. 10 is a flowchart illustrating an operation method of a multiple output rectifier according to a sixth embodiment of the present invention. The operation method in FIG. 10 is illustrated using the multiple output rectifier 600 in FIG. 6. Detailed steps are as follows:

Step 1000: Start.

Step 1002: The controller 602 generates a control signal according to each output voltage of a plurality of output voltages outputted by the multiple output rectifier 600 and a reference voltage corresponding to the each output voltage.

Step 1004: A turning-on circuit of the turning-on circuits 1024-1030 corresponding to the each output voltage generates a corresponding comparison signal according to the alternating current input voltage VIN and the each output voltage within a corresponding half period of the alternating current input voltage VIN corresponding to the each output voltage.

Step 1006: The turning-on circuit generates a corresponding turning-on signal according to the corresponding comparison signal and the control signal corresponding to the each output voltage.

Step 1008: The comparator-based circuit 1022 generates and outputs the each output voltage according to the corresponding turning-on signal.

Step 1010: End.

A difference between the embodiment in FIG. 10 and the embodiment in FIG. 8 is that in Step 1002, as shown in FIG. 6, the first sub-controller 6022 of the controller 602 generates the control signal VCTRL1 corresponding to the output voltage VOUT1 according to the first reference voltage VREF1 and the output voltage VOUT1, and the second sub-controller 6024 of the controller 602 generates the control signal VCTRL2 corresponding to the output voltage VOUT2 according to the second reference voltage VREF2 and the output voltage VOUT2, wherein operational principles of the control signal VCTRL1 generated by the first sub-controller 6022 and the control signal VCTRL2 generated by the second sub-controller 6024 in the embodiment in FIG. 10 can be referred to FIGS. 4, 5, so further description thereof is omitted for simplicity. In addition, subsequent operational principles of the embodiment in FIG. 10 are the same as those of the embodiment in FIG. 8, so further description thereof is omitted for simplicity.

To sum up, because the multiple output rectifier and the operation method thereof can provide a plurality of stable output voltages to a next stage circuit system, the present invention can be suitable for a wireless charging receiver. In addition, compared to the prior art, because the multiple output rectifier can stabilize the plurality of stable output voltages at corresponding predetermined values thereof by controlling turning-on times of transistors of the comparator-based circuit of the multiple output rectifier, the present invention does not need any additional direct current (DC)-direct current (DC) converter and discrete component. Therefore, because the present invention does not need any additional DC-DC converter and discrete component, the present invention not only can reduce cost of the multiple output rectifier, but can also be integrated into other application apparatuses easily.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multiple output rectifier, comprising:
   a comparator-based active rectification circuit for generating and outputting a plurality of output voltages within a same half period of an input voltage, wherein within the same half period, the active rectification circuit generates a corresponding comparison signal according to the input voltage and each output voltage of the plurality of output voltages, generates a corresponding turning-on signal according to the corresponding comparison signal and a control signal, and generates and outputs the each output voltage according to the corresponding turning-on signal, wherein the corresponding comparison signal corresponds to a predetermined time interval within the same half period, and the each output voltage is less than the input voltage within the predetermined time interval.

2. The multiple output rectifier of claim 1, further comprising:
   a controller coupled to the active rectification circuit for generating the control signal corresponding to the each output voltage.

3. The multiple output rectifier of claim 1, wherein the active rectification circuit generates and outputs the each output voltage within the same half period according to the input voltage, the each output voltage, and the control signal.

4. The multiple output rectifier of claim 1, wherein the active rectification circuit comprises:
   a comparator-based circuit for generating and outputting the each output voltage according to the corresponding turning-on signal; and
   a plurality of turning-on circuits coupled to the comparator-based circuit, wherein a turning-on circuit of the plurality of turning-on circuits corresponding to the each output voltage is used for generating the corresponding comparison signal according to the input voltage and the each output voltage, and generating the corresponding turning-on signal according to the corresponding comparison signal and the control signal.

5. The multiple output rectifier of claim 4, further comprising:
   a power supply circuit coupled to the active rectification circuit for generating a supply voltage applied to the plurality of turning-on circuits according to the input voltage.

6. A multiple output rectifier, comprising:
   a comparator-based active rectification circuit for generating and outputting a plurality of output voltages within a corresponding half period of an input voltage, wherein within the corresponding half period, the active rectification circuit generates a corresponding comparison signal according to the input voltage and each output voltage of the plurality of output voltages, generates a corresponding turning-on signal according to the corresponding comparison signal and a control signal, and generates and outputs the each output voltage according to the corresponding turning-on signal, wherein the corresponding comparison signal corresponds to a predetermined time interval within the corresponding half period, and the each output voltage is less than the input voltage within the predetermined time interval.

7. The multiple output rectifier of claim 6, wherein the active rectification circuit comprises:
   a comparator-based circuit for generating and outputting the each output voltage according to the corresponding turning-on signal; and
   a plurality of turning-on circuits coupled to the comparator-based circuit, wherein a turning-on circuit of the plurality of turning-on circuits corresponding to the each output voltage is used for generating the corresponding comparison signal according to the input voltage and the each output voltage, and generating the corresponding turning-on signal according to the corresponding comparison signal and the control signal.

8. The multiple output rectifier of claim 7, further comprising:
   a power supply circuit coupled to the active rectification circuit for generating a supply voltage applied to the plurality of turning-on circuits according to the input voltage.

9. The multiple output rectifier of claim 6, further comprising:
   a controller coupled to the active rectification circuit for generating the control signal corresponding to the each output voltage.

10. An operation method of a multiple output rectifier, wherein the multiple output rectifier comprises a comparator-based active rectification circuit, and the active rectification circuit comprises a comparator-based circuit and a plurality of turning-on circuits, the operation method comprising:
    a turning-on circuit of the plurality of turning-on circuits corresponding to each output voltage of a plurality of output voltages generating a corresponding comparison signal according to an input voltage and the each output voltage within a same half period of the input voltage;
    the turning-on circuit generating a corresponding turning-on signal according to the corresponding comparison signal and a control signal; and
    the comparator-based circuit generating and outputting the each output voltage according to the corresponding turning-on signal;
    wherein the corresponding comparison signal corresponds to a predetermined time interval within the same half period, and the each output voltage is less than the input voltage within the predetermined time interval.

11. The operation method of claim 10, wherein the active rectification circuit generates and outputs the each output voltage within the same half period according to the input voltage, the each output voltage, and the control signal.

12. An operation method of a multiple output rectifier, wherein the multiple output rectifier comprises a comparator-based active rectification circuit, and the active rectification circuit comprises a comparator-based circuit and a plurality of turning-on circuits, the operation method comprising:

a turning-on circuit of the plurality of turning-on circuits corresponding to each output voltage of a plurality of output voltages generating a corresponding comparison signal according to an input voltage and the each output voltage within a corresponding half period of the input voltage;

the turning-on circuit generating a corresponding turning-on signal according to the corresponding comparison signal and a control signal; and the comparator-based circuit generating and outputting the each output voltage according to the corresponding turning-on signal;

wherein the corresponding comparison signal corresponds to a predetermined time interval within the corresponding half period, and the each output voltage is less than the input voltage within the predetermined time interval.

13. An operation method of a multiple output rectifier, wherein the multiple output rectifier comprises a comparator-based active rectification circuit and a controller, and the active rectification circuit comprises a comparator-based circuit and a plurality of turning-on circuits, the operation method comprising:

the controller generating a control signal according to each output voltage of a plurality of output voltages outputted by the multiple output rectifier and a reference voltage corresponding to the each output voltage;

a turning-on circuit of the plurality of turning-on circuits corresponding to the each output voltage generating a corresponding comparison signal according to an input voltage and the each output voltage within a same half period of the input voltage;

the turning-on circuits generating a corresponding turning-on signal according to the corresponding comparison signal and the control signal; and the comparator-based circuit generating and outputting the each output voltage according to the corresponding turning-on signal;

wherein the corresponding comparison signal corresponds to a predetermined time interval within the same half period, and the each output voltage is less than the input voltage within the predetermined time interval.

14. The operation method of claim 13, wherein the active rectification circuit generates and outputs the each output voltage within the same half period according to the input voltage, the each output voltage, and the control signal.

15. An operation method of a multiple output rectifier, wherein the multiple output rectifier comprises a comparator-based active rectification circuit and a controller, and the active rectification circuit comprises a comparator-based circuit and a plurality of turning-on circuits, the operation method comprising:

the controller generating a control signal according to each output voltage of a plurality of output voltages outputted by the multiple output rectifier and a reference voltage corresponding to the each output voltage;

a turning-on circuit of the plurality of turning-on circuits corresponding to the each output voltage generating a corresponding comparison signal according to an input voltage and the each output voltage within a corresponding half period of the input voltage;

the turning-on circuits generating a corresponding turning-on signal according to the corresponding comparison signal and the control signal; and the comparator-based circuit generating and outputting the each output voltage according to the corresponding turning-on signal;

wherein the corresponding comparison signal corresponds to a predetermined time interval within the corresponding half period, and the each output voltage is less than the input voltage within the predetermined time interval.

* * * * *